United States Patent [19]

Yoshida et al.

[11] Patent Number: 4,811,805

[45] Date of Patent: Mar. 14, 1989

[54] REAR-WHEEL STEERING APPARATUS

[75] Inventors: Yasuhiko Yoshida, Anjo; Masahiro Honda, Aichi; Shozo Takizawa, Okazaki, all of Japan

[73] Assignee: Mitsubishi Jidosha Kogyo Kabushiki Kaisha, Tokyo, Japan

[21] Appl. No.: 925,747

[22] Filed: Oct. 30, 1986

[30] Foreign Application Priority Data

Nov. 8, 1985 [JP] Japan .................................. 60-250493

[51] Int. Cl.⁴ .............................................. B62D 5/087
[52] U.S. Cl. .................................... 180/140; 180/141; 180/143; 180/158; 280/91
[58] Field of Search .................. 280/91; 180/132, 140, 180/141, 158, 162, 234, 236

[56] References Cited

U.S. PATENT DOCUMENTS

| 3,185,245 | 5/1965 | Hoyt | 280/91 X |
| 4,295,657 | 10/1981 | Sano et al. | |
| 4,534,435 | 8/1985 | Shibahata et al. | |

FOREIGN PATENT DOCUMENTS

| 58-214470 | 12/1983 | Japan | |
| 59-6171 | 1/1984 | Japan | 280/91 |
| 60-46376 | 4/1985 | Japan | |
| 60-94869 | 5/1985 | Japan | 280/91 |
| 60-166566 | 8/1985 | Japan | 280/91 |
| 1252230 | 8/1986 | U.S.S.R. | 280/91 |

Primary Examiner—Charles A. Marmor
Attorney, Agent, or Firm—Hedman, Gibson, Costigan & Hoare

[57] ABSTRACT

A rear-wheel steering apparatus includes a steering unit for steering the front wheels in association with a rotation of the steering wheel, and a hydraulic actuator for steering the rear wheels. The actuator has first and second hydraulic chambers and a drive member connected to the rear wheels and operating in accordance with an oil pressure supplied to the hydraulic chambers. A directional control valve is provided between the steering unit and the actuator. The valve supplies oil pressure to the actuator in association with the operation of the steering unit. The valve includes a casing, and a valve body slidably arranged in the casing. First and second pressure chambers filled with oil pressure are defined in the casing. When the steering angle of the front wheels is smaller than a predetermined angle, the valve body moves to an in-phase position for supplying oil pressure to the actuator so that the rear wheels are steered in the same direction as the front wheels. When the steering angle is larger than the predetermined angle, the valve body moves to an antiphase position for supplying oil pressure to the actuator so that the rear wheels are steered in the direction opposite to the steering direction of the front wheels.

13 Claims, 8 Drawing Sheets

REAR-WHEEL STEERING APPARATUS

BACKGROUND OF THE INVENTION

The present invention relates to a rear-wheel steering apparatus for a vehicle, capable of steering rear wheels in association with front wheels.

In general, a vehicle is turned in its steering direction by steering its front wheels. Recently, however, rear-wheel steering apparatuses have been developed, which steer rear wheels in a direction in phase with the steering direction of the front wheels, thereby improving the driving stability and cornering performance of the vehicle. These apparatuses can also steer the rear wheels in a direction opposite, in phase, to the steering direction of the front wheels, thereby reducing the turning diameter of the vehicle.

In an apparatus disclosed in Japanese Patent Disclosure No. 58-214470, for example, the steering direction of rear wheels is controlled by using a solenoid spool valve as a directional control valve, which operates in accordance with the steering angle of a steering wheel, detected by a steering-angle detector.

However, the solenoid spool valve is expensive and requires use of the steering-angle detector and an amplifier. Therefore, the disclosed apparatus is complicated in construction and high in cost. Meanwhile, the steering direction or steering angle of the rear wheels must be controlled, in accordance with the steering angle of the steering wheel, in a manner such that the rear wheels are steered in phase with and in opposite phase to the front wheels, when the steering angle of the steering wheel is small and large, respectively. Accordingly, a microcomputer or some other complicated control device is needed to operate the solenoid spool valve, thus further increasing the cost of the apparatus.

In an apparatus disclosed in Japanese Utility Model Disclosure No. 60-46376, an oil pressure acting on an actuator for rear-wheel steering is controlled by means of a spool valve, which is actuated by operating the steering wheel. However, this apparatus can steer the rear wheels only in phase with the front wheels, and not in opposite phase. If an external force from the road surface is applied to the rear wheels, moreover, a reaction force acts on the steering wheel, through a hydraulic circuit, thus spoiling the steering feel.

SUMMARY OF THE INVENTION

The present invention has been developed in consideration of these circumstances, and is intended to provide a rear-wheel steering apparatus of a simple construction, which uses a single directional control valve, associated with a steering unit, whereby rear wheels can be steered both in phase with and in opposite phase to front wheels, when the steering angle of the steering wheel is small and large, respectively, without using any complicated, expensive control device.

In order to achieve the above object, according to the present invention, a directional control valve is used to control the supply of oil pressure to a hydraulic actuator, which steers rear wheels in association with a steering unit. The control valve includes a casing; a control valve body arranged in the casing so that a relative displacement, corresponding to the steering direction and steering angle of front wheels, is produced between the casing and the valve body, in association with the operation of the steering unit; first and second pressure chambers defined by the casing and the valve body, and supplied alternatively with the pressure oil, in accordance with the direction of the relative displacement of the valve body; first and second in-phase ports formed in the casing so as to communicate individually with first and second hydraulic chambers of the actuator; and first and second antiphase ports formed in the casing so as to communicate individually with the second and first hydraulic chambers. The valve body is so formed that, before the relative displacement of the valve body reaches a predetermined distance, the two antiphase ports are closed and the two in-phase ports are allowed to open into the pressure chambers. When the relative displacement exceeds the predetermined distance, the in-phase ports are closed, and the antiphase ports are allowed to open into the pressure chambers. The in-phase ports are arranged so as to connect that pressure chamber, which is supplied with the pressure oil, and that hydraulic chamber of the actuator, which serves to steer the rear wheels in the same direction as the front wheels. The antiphase ports are arranged so as to connect that pressure chamber, which is supplied with the pressure oil, and that hydraulic chamber of the actuator, which serves to steer the rear wheels in the direction opposite to the steering direction of the front wheels. Thus, the rear wheels are steered in phase with and in opposite phase to the front wheels, when the steering angle of the steering wheel is small and large, respectively.

BRIEF DESCRIPTION OF THE DRAWINGS

FIGS. 1 to 4 show a rear-wheel steering apparatus according to a first embodiment of the present invention, in which

FIGS. 5 to 6B show a second embodiment of the invention, in which

FIGS. 8 and 9 show an apparatus according to a fourth embodiment of the invention, in which

DETAILED DESCRIPTION OF THE PREFERRED EMBODIMENTS

Preferred embodiments of the present invention will now be described in detail with reference to the accompanying drawings.

Figure 1:
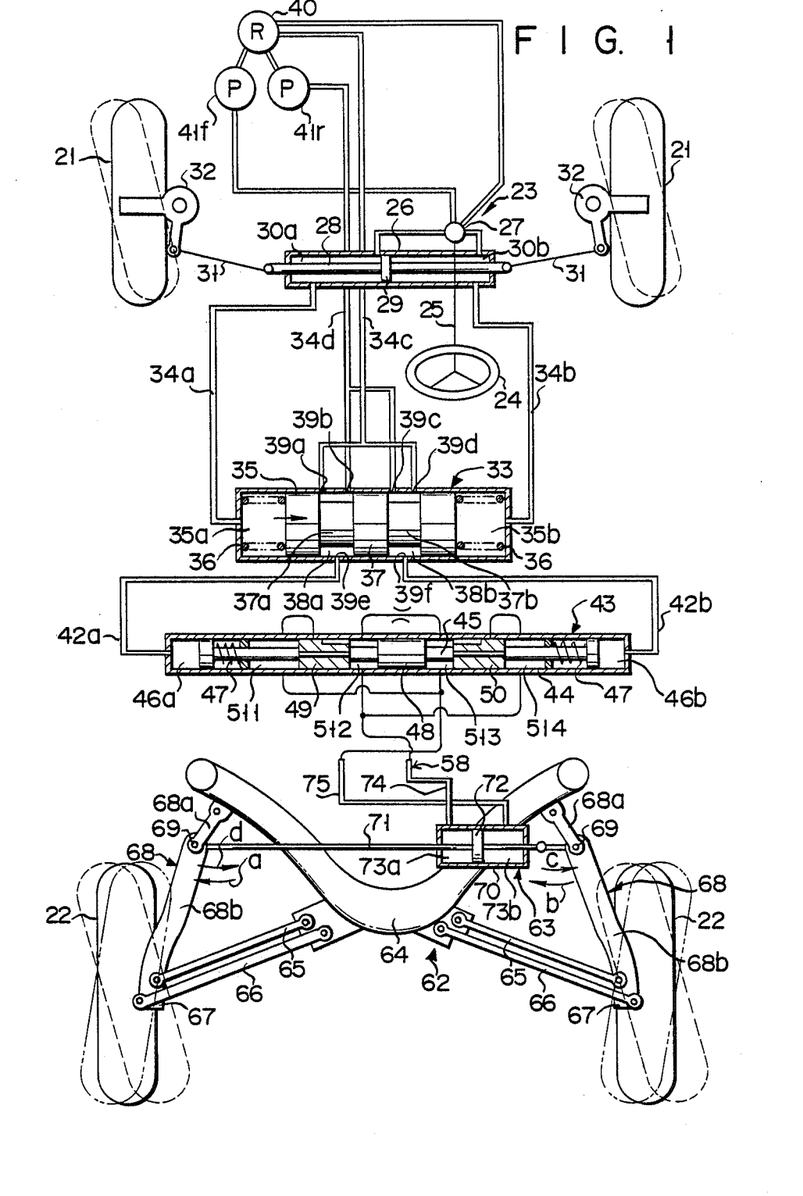
FIG. 1 is a plan view schematically showing an outline of the apparatus.

FIG. 1 schematically shows a configuration of a vehicle which is provided with a rear-wheel steering apparatus according to a first embodiment of the present invention. Referring to FIG. 1, there are shown front wheels 21, rear wheels 22, power-steering system 23, and steering wheel 24. Wheel 24 is coupled to control valve 27 of power cylinder 26 and a power-steering gear box (not shown), by means of shaft 25. Cylinder 26 contains piston rod 28 and piston 29 fixed thereto. The inside of cylinder 26 is divided into two chambers 30a and 30b by piston 29. Each end portion of rod 28 projects outward from cylinder 26, and is coupled to knuckle arm 32, for supporting each corresponding front wheel 21, by means of tie rod 31. Valve 27 is connected to reservoir 40, power-steering pump 41f, and left and right chambers 30a and 30b of cylinder 26.

Power cylinder 26 is connected to hydraulic selector valve 33 via hydraulic-oil pipes 34a and 34b. Valve 33 includes cylindrical valve case 35, and spool 37 contained in case 35 for axial sliding motion and having urging spring 36 at each end. Left and right valve chambers 35a and 35b are defined on the left- and right-hand sides, respectively, of spool 37 in case 35. Chambers 35a and 35b communicate with left and right chambers 30a and 30b of cylinder 26 through pipes 34a and 34b, respectively. Spool 37 has a pair of small-diameter portions 37a and 37b in its middle portion. First and second valve chambers 38a and 38b are defined between the inner wall surface of case 35 and portions 37a and 37b. First to sixth ports 39a to 39f are bored through the peripheral wall of valve case 35. When spool 37 is located in its neutral position or in the center of case 35, chamber 38a communicates with first, second, and fifth ports 39a, 39b and 39e, while chamber 38b communicates with third, fourth, and sixth ports 39c, 39d and 39f. First and fourth ports 39a and 39d are connected to reservoir 40 through pipe 34c, while second and third ports 39b and 39c are connected to oil pump 41r for rear-wheel steering, by means of pipe 34d.

Fifth and sixth ports 39e and 39f of hydraulic selector valve 33 communicate with directional control valve 43 by means of hydraulic-oil pipes 42a and 42b, respectively. Thus, a supplementary oil pressure for steering, produced in power-steering system 23, is introduced, as a pilot pressure, into left and right valve chambers 35a and 35b of valve 33, via power cylinder 26. The pilot pressure actuates spool 37. Valve 33 serves to change the connection of a hydraulic circuit, including reservoir 40, pump 41r and valve 43.

Figure 2:
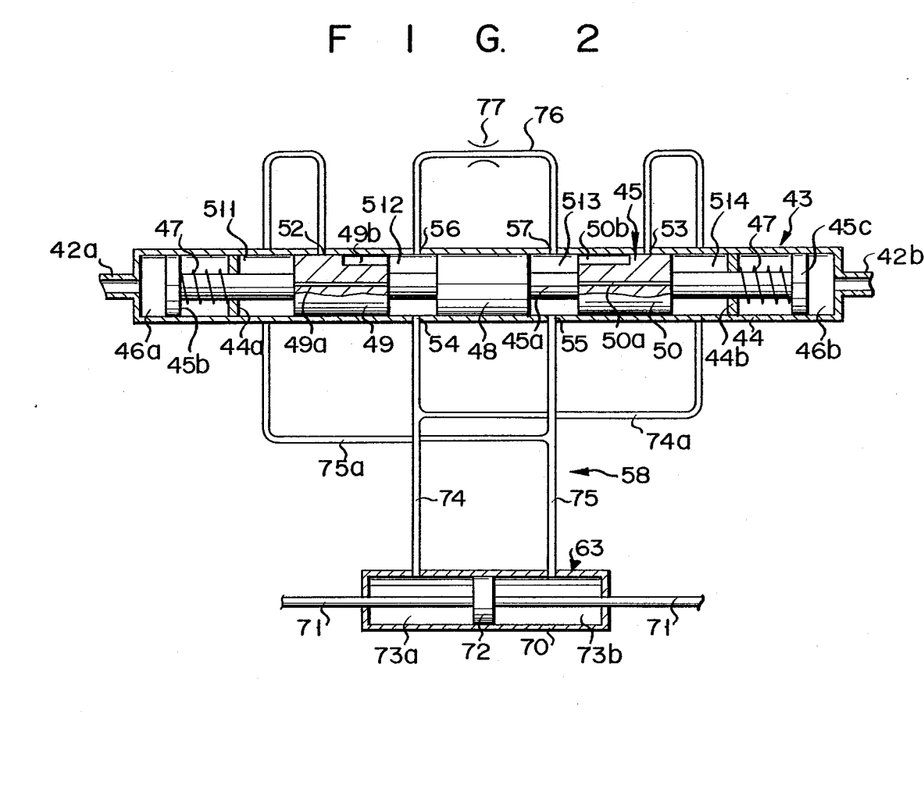
FIG. 2 is an enlarged sectional view of a directional control valve.

Referring now to FIG. 2, directional control valve 43 will be described in detail. Valve 43 includes cylinder 44, for use as a casing, and valve body 45 arranged in cylinder 44 for axial reciprocation. Left and right pilot chambers 46a and 46b are formed individually at two opposite end portions of cylinder 44. Chambers 46a and 46b communicate with first and second valve chambers 38a and 38b, respectively, of hydraulic selector valve 33. Valve body 45 is moved in the axial direction by a difference in pressure between the two pilot chambers. The valve body includes rod 45a, and center, left, and right spools 48, 49 and 50, fixed on the rod. The three spools are spaced along the axis of the rod. Left and right disk-shaped end plates 45b and 45c are fixed individually to two opposite ends of rod 45a. Thus, valve body 45 is in the form of a spool assembly. Partition walls 44a and 44b are provided individually at the end portions of cylinder 44, so that rod 45a of body 45 extends through walls 44a and 44b. Left pilot chamber 46a is defined by plate 45b and the inner surface of cylinder 44, while right pilot chamber 46b is defined by plate 45c and the inner surface of cylinder 44. A pair of return springs 47 are interposed between plate 45b and wall 44a, and between plate 45c and wall 44b, respectively.

Normally, springs 47 keep valve body 45 in its neutral position or in the center of cylinder 44. Valve body 45, cylinder 44, and partition walls 44a and 44b define first to fourth pressure chambers 511 to 514, arranged successively from left to right of FIG. 2. Hydraulic oil is sealed in these pressure chambers. Thus, chambers 511 to 514 constitute pressure control chambers, whose capacities vary as valve body 45 moves relative to cylinder 44. Left spool 49 is formed with communication passage 49a which connects first and second pressure chambers 511 and 512. Right spool 50 is formed with communication passage 50a which connects third and fourth pressure chambers 513 and 514. Thus, when valve body 45 moves relatively to cylinder 44 so that the capacities of first and fourth pressure chambers 511 and 514 change, first and second pressure chambers 511 and 512 or third and fourth pressure chambers 513 and 514 are compressed alternatively to high pressure. In other words, oil pressure is fed alternatively to the second or third pressure chamber. The peripheral wall of cylinder 44 is formed with left and right ports 52 and 53, which are opened and closed by left and right spools 49 and 50, respectively. Communication groove 49b is formed on the top portion of the peripheral wall of left spool 49, extending from the middle portion of spool 49 toward center spool 48. Likewise, communication groove 50b is formed on the top portion of the peripheral wall of right spool 50, extending from the middle portion of spool 50 toward spool 48. Further, the peripheral wall of cylinder 44 is formed with first and second center ports 54 and 55 and first and second bypass ports 56 and 57. Port 54 is opened and closed by center and left spools 48 and 49; port 55 by center and right spools 48 and 50, and ports 56 and 57 by spool 48. Left and right ports 52 and 53 constitute in-phase ports, while center ports 54 and 55 constitute antiphase ports. By-pass ports 56 and 57 serve as communication ports.

Constructed in this manner, directional control valve 43 communicates, by means of hydraulic circuit 58, with hydraulic actuator 63 which is attached to rear suspension 62.

As shown in FIG. 1, rear suspension 62 includes cross member 64 and lateral arms. The lateral arms include upper arms 65 and lower arms 66, whose inner ends are pivotally attached to the central portion of cross member 64. Wheel supporters 67 for supporting rear wheels 22 are pivotally mounted on the respective outer end portions of arms 65 and 66. Supporters 67 are fixed individually to the rear end portions of a pair of trailing arms 68. The front end portions of arms 68 are pivotally mounted to their corresponding outer end portions of member 64. Each of arms 68 is divided into two parts, front and rear arms 68a and 68b, which are coupled by means of pivot 69 having a vertical axis of rotation.

Hydraulic actuator 63 is fixed to the upper portion of cross member 64, so as to extend in the transverse direction of the vehicle. As shown in FIG. 2, actuator 63 includes hydraulic cylinder 70, which contains piston 72 having piston rod 71 which extends from both ends of the piston, with respect to the axial direction of cylinder 70. Piston 72 divides the inside of hydraulic cylinder 70 into left and right chambers 73a and 73b, which serve as hydraulic chambers. Two opposite ends of rod 71 extend from cylinder 70, and are coupled to pivots 69 of their corresponding trailing arms 68. Left chamber 73a of cylinder 70 is connected to first center port 54 by means of first hydraulic system 74 of hydraulic circuit 58. Chamber 73a is also connected to right port 53 by means of first branch passage 74a, which diverges from system 74. Right chamber 73b is connected to second center port 55 by means of second hydraulic system 75, and also to left port 52 by means of second branch passage 75a, which diverges from system 75. Moreover, first and second by-pass ports 56 and 57 communicate with each other by means of by-pass line 76. Throttle 77 is provided in the middle of line 76.

The operation of the rear-wheel steering apparatus, with the aforementioned construction, will now be described. When the vehicle moves straight ahead, steering wheel 24 is in the neutral position, so that front and rear wheels 21 and 22 are directed straight forward, as indicated by full lines in FIG. 1. If wheel 24 is rotated counterclockwise to turn the vehicle to the left, the turning effort of wheel 24 is transmitted through shaft 25 to control valve 27. Then, the supplementary oil pressure from control valve 27 acts on left chamber 30a of power cylinder 26, thereby moving piston 29 to the right. As a result, knuckle arms 32 are rocked counterclockwise, through the medium of piston rod 28 and tie rods 31, so that front wheels 21 are turned to the left, as indicated by broken lines. Meanwhile, the supplementary oil pressure, fed into chamber 30a of cylinder 26, acts also on left valve chamber 35a of hydraulic selector valve 33, coming through hydraulic-oil pipe 34a. Thus, the pressure inside chamber 35a is increased, so that spool 37 of selector valve 33, having so far been in its neutral position, moves to the right.

Figure 3:
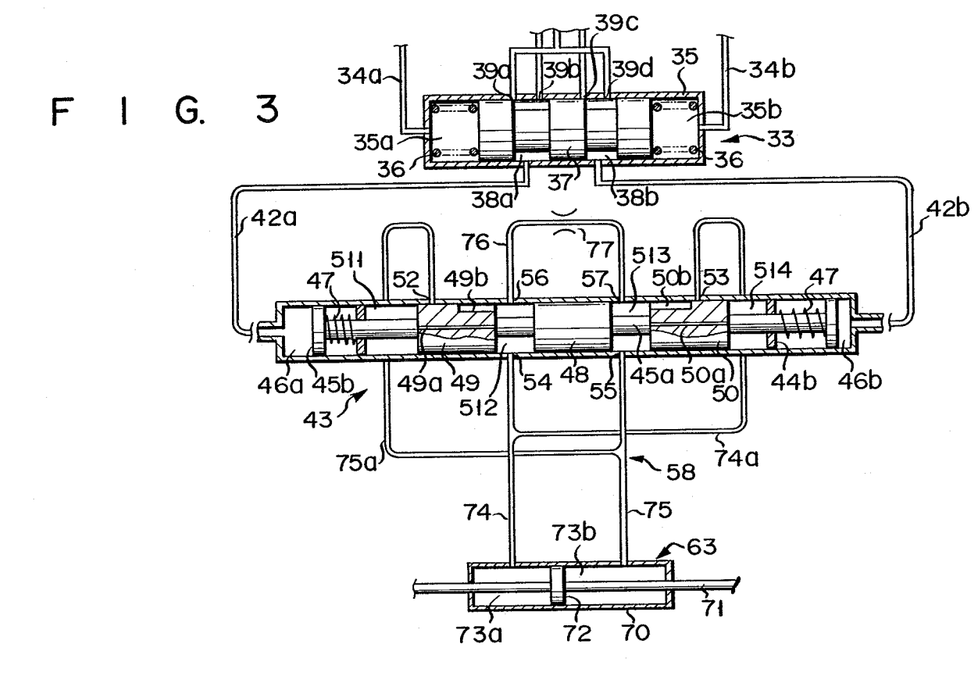
FIGS. 3 and 4 are sectional views showing different operating states of a hydraulic selector valve and the directional control valve.

If the front-wheel steering angle is small (about 6 degrees or less), spool 37 moves only for a short distance, as shown in FIG. 3. Thereupon, first and third ports 39a and 39c are partially closed by spool 37, thus reducing their opening area, while second and fourth ports 39b and 39d are kept fully open. Accordingly, the oil pressure from oil pump 41r to first valve chamber 38a is increased, thus raising the pressure inside chamber 38a. At the same time, feedback of oil pressure from second valve chamber 38b to reservoir 40 is increased, thus lowering the pressure inside chamber 38b. As a result, left pilot chamber 46a of directional control valve 43, communicating with chamber 38a by means of hydraulic-oil pipe 42a, is compressed to high pressure. On the other hand, right pilot chamber 46b, connecting with chamber 38b by means of hydraulic-oil pipe 42b, is decompressed to low pressure. Thus, control valve body 45 moves slightly to the right. Pressure oil in fourth pressure chamber 514, whose capacity changes as right spool 50 shifts its position, is fed into third pressure chamber 513, through communication passage 50a. Accordingly, chamber 513 is compressed to high pressure, so that the pressure oil in chamber 513 is introduced into right chamber 73b of hydraulic actuator 63, via second center port 55 and second hydraulic system 75. When the pressure inside chamber 73b rises, piston 72 moves to the left, so that the manual steering effort is transmitted to pivots 69 of trailing arms 68, by way of piston rod 71. Namely, left-hand trailing arm 68 of the vehicle rocks so as to project outward or in the direction of arrow (a), while the right-hand one is pulled inward or in the direction of arrow (b). As a result, rear wheels 22, like front wheels 21, are turned to the left, as indicated by broken lines in FIG. 1. Thus, the front and rear wheels are in phase, so that the vehicle can enjoy high driving stability.

Second and third pressure chambers 512 and 513 of directional control valve 43 communicate with each other by means of by-pass line 76, which has throttle 77 in the middle. Therefore, oil can be exchanged between chambers 512 and 513, by means of line 76, as control valve body 45 moves. As the difference in pressure between second and third pressure chambers 512 and 513 becomes greater, the flow resistance of throttle 77 increases in proportion. Therefore, the higher the steering speed of steering wheel 24 or the moving speed of valve body 45, the pressure difference is greater, and also, the steering angle of rear wheels 22 is larger. Accordingly, the rear-wheel steering angle is larger at the time of quick steering than at the time of slow steering. Thus, the steering response of the vehicle, corresponding to the steering speed of steering wheel 24, can be improved. If the driver slightly rocks wheel 24 while the vehicle is running straight ahead, the steering speed, in this situation, is so low that the flow resistance of throttle 77 is small. Even in such a case, therefore, rear wheels 22 can be prevented from swinging unexpectedly, hardly producing any steering angle.

Figure 4:
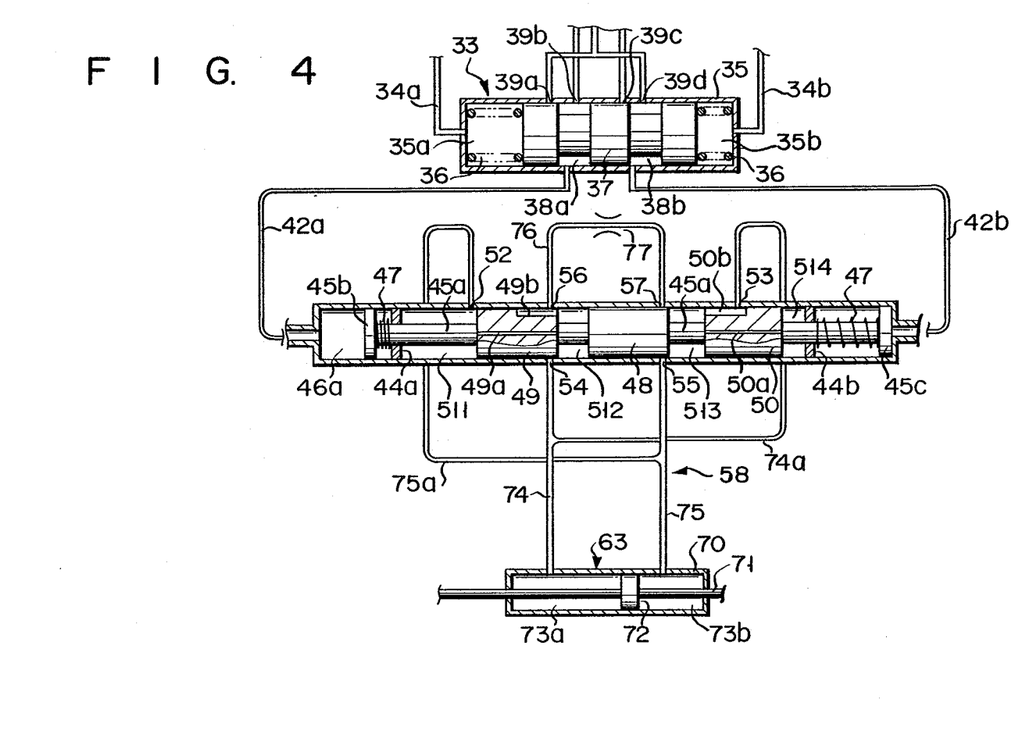

If the front-wheel steering angle is large, spool 37 of hydraulic selector valve 33 moves over a long distance, as shown in FIG. 4, so that first and third ports 39a and 39c are fully closed by the spool, while only second and fourth ports 39b and 39d are kept open. As a result, first valve chamber 38a fully communicates with oil pump 41r, so that its internal pressure becomes higher than that obtained when the front-wheel steering angle is small, as aforesaid. On the other hand, second valve chamber 38b fully communicates with reservoir 40, so that its internal pressure becomes lower than in the aforesaid case, where the front-wheel steering angle is small. Thus, the pressure inside left pilot chamber 46a of directional control valve 43, connecting with chamber 38a, becomes higher than in the aforesaid case, so that control valve body 45 moves substantially to the right. Accordingly, right port 53, having so far been closed by right spool 50, is opened, thus connecting with third pressure chamber 513 by means of communication groove 50b. Meanwhile, second center port 55 and second by-pass port 57 are closed by center spool 48. Also, first center port 54 is closed by left spool 49, while left port 52 opens into first pressure chamber 511 as spool 49 moves. As a result, third pressure chamber 513 is compressed to high pressure, and oil in chamber 513 is fed into left chamber 73a of hydraulic cylinder 70, via right port 53, first branch passage 74a, and first hydraulic system 74. At this point of time, right chamber 73b of cylinder 70 communicates with chamber 511 of directional control valve 43, by means of second hydraulic system 75, second branch passage 75a, and left port 52, so that oil in chamber 73b is fed into chamber 511 via system 75 and passage 75a. Thereupon, a difference in pressure is produced between left and right chambers 73a and 73b, so that piston 72 moves to the right, in contrast with the case where the steering angle is narrow. Accordingly, the manual steering effort is transmitted to pivots 69 of trailing arms 68 through piston rod 71. Thus, right-hand trailing arm 68 of the vehicle rocks so as to project outward or in the direction of arrow (c), while the left-hand one is pulled inward or in the direction of arrow (d). As a result, rear wheels 22, in contrast with front wheels 21, are turned to the right, as indicated by two-dot chain lines in FIG. 1. Thus, the front and rear wheels are in opposite phase, so that the minimum turning diameter of the vehicle can be reduced. In this case, moreover, second by-pass port 57 is closed, so that rear wheels 22 undergo a change of steering angle irrespective of the steering speed, without such an action of throttle 77 as is experienced with the small front-wheel steering angle.

According to the first embodiment of the present invention, as described above, the in-phase steering, with the small front-wheel steering angle, and the antiphase steering, with the large front-wheel steering angle, can be accomplished by the use of directional control valve 43 of a relatively simple construction, without using any electrical control means.

The oil pressure for front-wheel power steering acts, as a pilot pressure, on hydraulic selector valve 33. Meanwhile, the oil pressure from oil pump 41r is controlled by valve 33, and acts, as a pilot pressure, on directional control valve 43. Namely, a two-stage pilot-oil-pressure circuit is provided between the power steering means for front wheels 21 and hydraulic actuator 63. Even if an external force is applied to rear wheels 22, from the road surface, therefore, steering wheel 24 can maintain a good steering feel, without receiving any substantial reaction force due to the external force.

By the agency of throttle 77, moreover, the in-phase steering angle of the rear wheels, produced when the front-wheel steering angle is small, can be increased in response to the steering speed of steering wheel 24. Thus, the steering response of the vehicle, when the vehicle is to be turned, can be improved. Also, when the vehicle moves straight ahead, the rear wheels can be prevented from being turned unexpectedly by a minor steering action.

Figure 5:
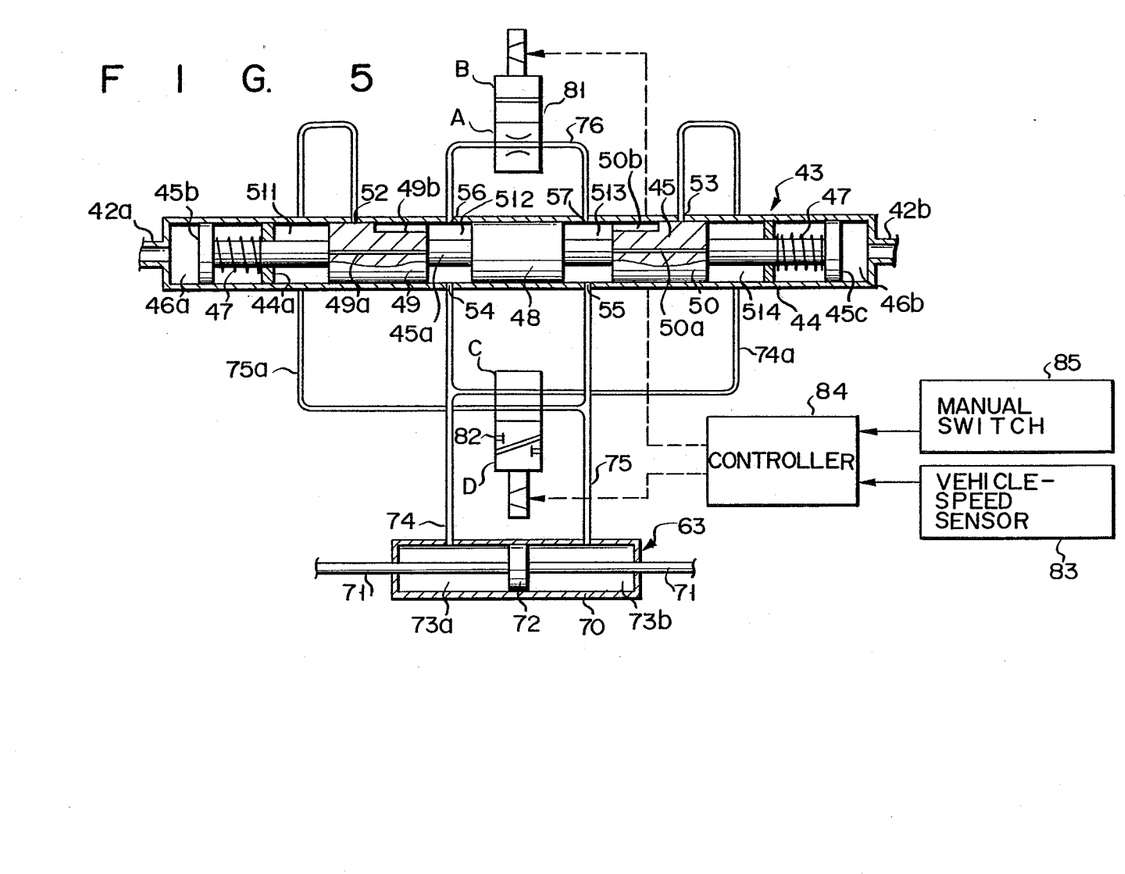
FIG. 5 is a sectional view of a directional control valve of an apparatus according to the second embodiment.
Figure 6A:
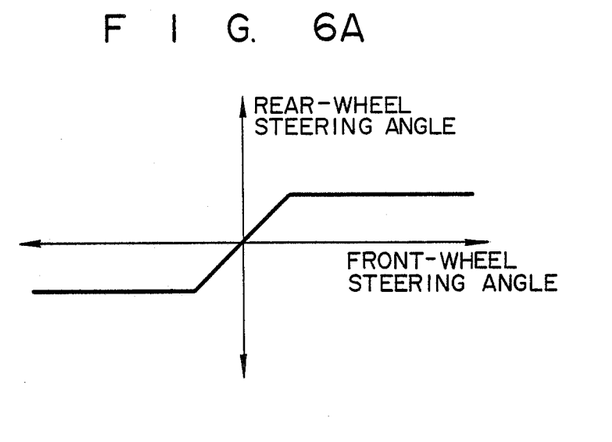
FIG. 6A is a diagram showing the relationship between the front-wheel steering angle and the rear-wheel steering angle as a vehicle moves at high speed.
Figure 6B:
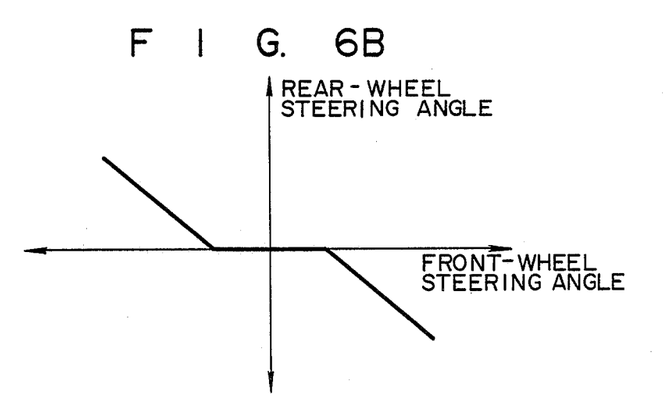
FIG. 6B is a diagram showing the relationship between the front-wheel steering angle and the rear-wheel steering angle as a vehicle moves at low speed.

FIG. 5 shows a second embodiment of the present invention, in which the rear wheels can be steered and locked according to the vehicle speed. In FIG. 5, showing directional control valve 43, like reference numerals refer to like components as shown in FIG. 2, and description thereof is omitted. According to this embodiment, first solenoid valve 81 is provided in the middle of by-pass line 76, while second solenoid valve 82 is provided at the respective middle portions of first and second branch passages 74a and 75a. Valve 81 is formed with port A which has a throttling function, controlled by on-off switching, and port B which is open. Valve 82 is formed with ports C and D which are controlled by on-off switching. Port C keeps hydraulic system 58 in the same state as in the first embodiment. Port D connects left and right ports 52 and 53. First and second solenoid valves 81 and 82 are connected with controller 84, which is controlled by a vehicle-speed signal from vehicle-speed sensor 83. Controller 84 can be shifted between three stages, OFF, NORMAL, and AUTO, by means of manual switch 85. In the OFF mode, by-pass line 76 is opened by way of port B of first solenoid valve 81, and first and second branch passages 74a and 75a communicate with each other by means of port D of second solenoid valve 82. If valve body 45 of directional control valve 43 is moved by steering front wheels 21, therefore, second and third pressure chambers 512 and 513 communicate with each other by means of by-pass line 76, thus producing no pressure change between the two pressure chambers. At the same time, first and second hydraulic systems 74 and 75 communicate with each other. Accordingly, hydraulic actuator 63 never operates, so that rear wheels 22 are locked and prevented from being steered. In the AUTO mode, first and second solenoid valves 81 and 82 are switched by on-off control, in response to the signal from vehicle-speed sensor 83. If the vehicle speed detected by sensor 83 is higher than a predetermined speed, by-pass line 76 is opened by way of port A of valve 81, and left and right ports 52 and 53 connect with each other by means of port D of valve 82. Thus, if the vehicle is driven with a small front-wheel steering angle while it moves at high speed, a pressure difference is produced between pressure chambers 512 and 513, as in the case of the first embodiment, so that rear wheels 22 are steered in phase. If the vehicle is driven with a large steering angle while it moves at high speed, the hydraulic oil is transferred between ports 52 and 53 via port D, so that wheels 22 cannot be steered in opposite phase to the front wheels. First and second center ports 54 and 55 are closed by center spool 48 or left or right spool 49 or 50. As a result, first and second hydraulic systems 74 and 75 are cut off in the middle. Even when the front-wheel steering angle is large, therefore, in-phase steering can be ensured. If the vehicle speed detected by sensor 83 is lower than the predetermined speed, by-pass line 76 is opened by way of port B of valve 81, and hydraulic systems 74 and 75 are separated by port C of valve 82. When the front-wheel steering angle is small, therefore, second and third pressure chambers 512 and 513 communicate with each other by means of line 76, thus producing no pressure difference between them. Accordingly, hydraulic actuator 63 never operates. Thus, if the steering angle of front wheels 21 is small, that of rear wheels 22 is zero. If the vehicle is driven with a large front-wheel steering angle, while it moves at low speed, however, either first or second by-pass port 56 or 57 is closed by center spool 58, so that by-pass line 76 is cut off. As a result, a pressure difference is produced between pressure chambers 512 and 513, so that actuator 63 operates. In this case, the steering is effected in the opposite phase, as in the case of the large-angle steering at low speed, according to the first embodiment. Thus, by switching on or off first and second solenoid valves 81 and 82, in accordance with the vehicle speed, the vehicle is steered in the following manner. As shown in FIG. 6A, while the vehicle moves at high speed, the rear-wheels are steered in phase if the front-wheel steering angle is small or large. When the front-wheel steering angle is small, the rear-wheel steering angle is increased in accordance with the front-wheel steering. When the front-wheel steering angle exceeds a predetermined level, the rear-wheel steering angle is kept at a constant. As shown in FIG. 6B, while the vehicle moves at low speed, the rear-wheel steering angle is zero if the front-wheel steering angle is small, and antiphase steering is effected if the front-wheel steering angle is large. The positions of valves 81 and 82 for these individual cases are shown in the table below.

TABLE

|  |  | First solenoid valve | | Second solenoid valve | |
| --- | --- | --- | --- | --- | --- |
|  |  | High speed | Low speed | High speed | Low speed |
| Manual switch position | OFF | | B | | D |
| | NORM | | A | | C |
| | AUTO | A | B | D | C |

Figure 7:
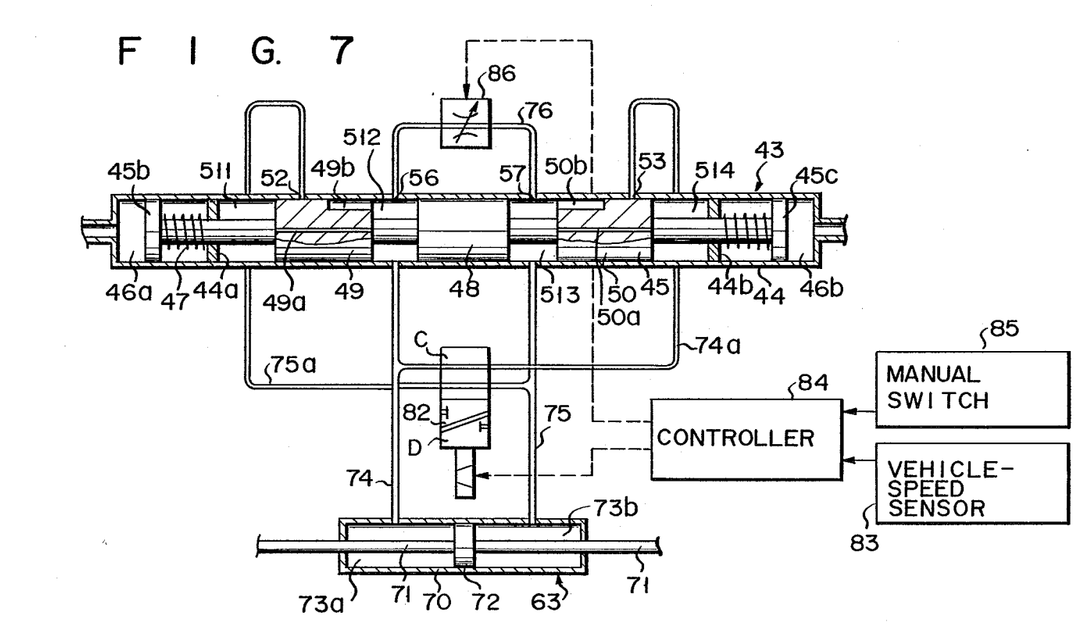
FIG. 7 is a sectional view of a directional control valve of an apparatus according to a third embodiment of the invention.

According to the second embodiment described above, by-pass line 76 is provided with the solenoid valve, which is formed with port A, having a throttling function, and open port B. Alternatively, however, line 76 may be fitted with variable throttle valve 86, as shown in FIG. 7. The throttling volume of valve 86 is variable in response to the signal from vehicle-speed sensor 83. Only antiphase steering can be effected when valve 86 is opened while the vehicle moves at low speed.

Figure 8:
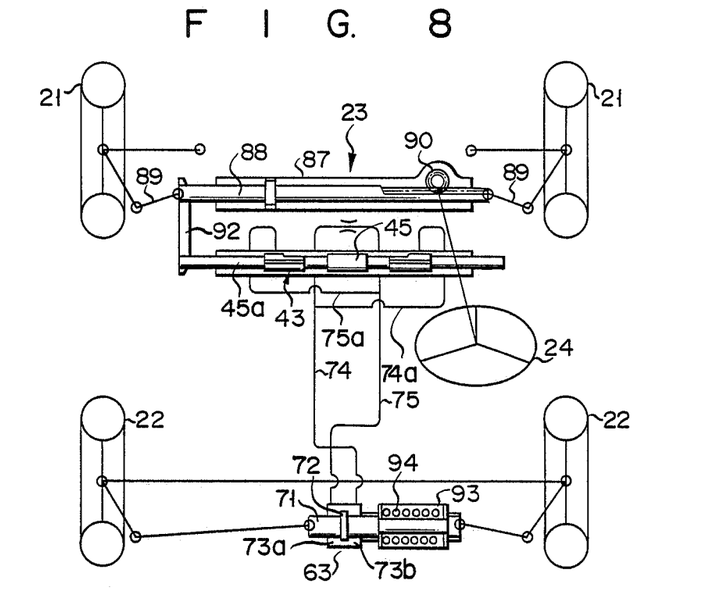
FIG. 8 is a plan view schematically showing an outline of the apparatus.
Figure 9:
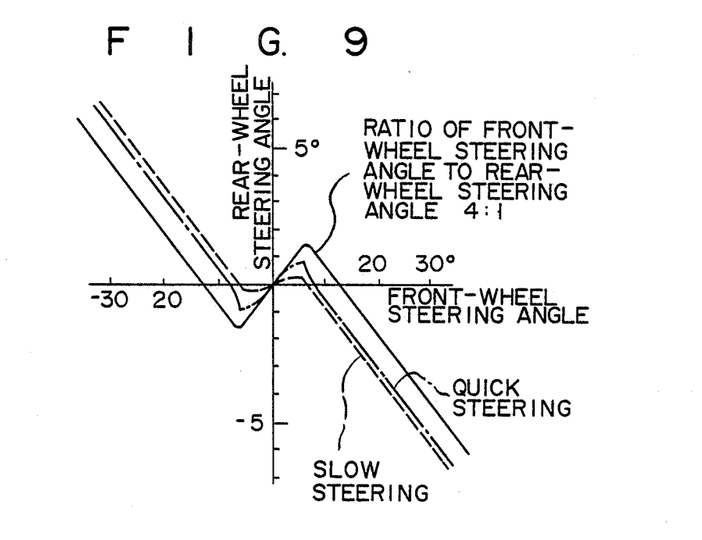
FIG. 9 is a diagram for illustrating a rear-wheel steering mode.

FIGS. 8 and 9 show a fourth embodiment of the present invention. According to this embodiment, the steering system is a conventional one which has no power assistance means. This system is provided with hydrocylinder 87, in which reciprocating rod 88 is inserted. Two opposite ends of rod 88 are coupled individually to tie rods 89, and its middle portion is associated with steering shaft 91 by means of rack-and-pinion mechanism 90. Also, one end of rod 88 is coupled through connecting member 92 to rod 45a of valve body 45 of directional control valve 43, which has the same construction as the one used in the first embodiment. In other words, valve 43 is mechanically connected to the steering system. As in the first embodiment, valve 43 is connected to hydraulic actuator 63 by means of first and second hydraulic systems 74 and 75 having branch passages 74a and 75a, respectively. In the rear suspension mechanism, in the third embodiment, system 75 communicates with left chamber 73a of actuator 63, while system 74 connects with right chamber 73b, thereby reversing the operating direction of actuator 63. Neutral setting mechanism 93 is provided at one end of piston rod 71 of actuator 63. Mechanism 93 includes mechanical spring 94 which stands the maximum self-aligning torque for running. Spring 94 serves to keep piston 72 in its neutral position. In case of oil leakage, piston 72 is set to its central position by spring 94. Thus, if steering wheel 24 is turned counterclockwise, for example, reciprocating rod 88 is moved to the right by means of steering shaft 91 and rack-and-pinion mechanism 90. As rod 88 moves to the right in this manner, front wheels 21 are directed to the left, through the medium of the rods 89. As rod 88 moves in this manner, moreover, valve body 45 of directional control valve 43 is moved to the right, with the aid of connecting member 92. As body 45 moves in this manner, a pressure difference is produced between second and third pressure chambers 512 and 513 (FIG. 2), as in the first embodiment, thus operating hydraulic actuator 63. If the front-wheel steering angle is small, the action of body 45 is small, as shown in FIG. 9, so that rear wheels 22 can be steered in phase. If the front-wheel steering angle is large, the action of body 45 is substantial, so that wheels 22 can be steered in the opposite phase. Thus, rear wheels 22 are steered in phase with front wheels 21 when the steering angle of wheels 21 is small (e.g., about 6 degrees or less). When the front-wheel steering angle is large, wheels 22 are steered in opposite phase to wheels 21. As in the case of the first embodiment, the in-phase steering zone has a differential response to steering wheel 24, motivated by the action of throttle 77. When the steering action is slow, the rear-wheel steering angle can be reduced, as indicated by broken line in FIG. 9.

In the third embodiment, moreover, directional control valve 43 is connected mechanically to the steering system, in a direct manner. Therefore, the apparatus of this embodiment can readily be applied to a vehicle which is not provided with any power-steering system.

Furthermore, the rear wheels are steered by means of the hydraulic oil, sealed in directional control valve 43, so that the in-phase rear-wheel steering, for the small front-wheel steering angle, and the antiphase rear-wheel steering, for the large front-wheel steering angle, can be accomplished with use of a very simple arrangement, without requiring any hydraulic source, such as an oil pump.

In the above description of the first to fourth embodiments, the vehicle is supposed to be turned to the left. However, the vehicle can be turned to the right by only moving the valve body of the directional control valve to the left, so that the course of oil supply to the hydraulic actuator is reversed. Thus, the fundamental operation never varies with the turning direction of the vehicle.

According to the present invention, as described in detail herein, a hydraulic actuator is controlled by means of a single directional control valve, which is associated with the steering system, so that the rear wheels are steered in phase with the front wheels when the steering angle of the front wheels is small. Thus, the driving stability and cornering performance of the vehicle can be improved. When the front-wheel steering angle is large, moreover, the rear wheels can be steered in opposite phase to the front wheels, thereby reducing the turning diameter of the vehicle. Also, the apparatus of the invention is simple in construction and low in cost. Since the oil pressure produced by the power-steering system is fed, as a pilot pressure, to the directional control valve, furthermore, a reaction force from the rear wheels, against the steering force, cannot act on the steering wheel. Thus, the steering feel is improved.

What is claimed is:

1. A rear-wheel steering apparatus for a vehicle, which includes front wheels and rear wheels, suspended on a vehicle body and adapted to be shifted by steering means, and a steering wheel, comprising:
a steering unit for steering the front wheels in response to a rotation of the steering wheel;
a hydraulic actuator for steering the rear wheels, said actuator including left and right hydraulic chambers, and a drive member connected to the rear wheels and operating in response to a hydraulic pressure supplied to the hydraulic chambers; and
a directional control valve for supplying hydraulic pressure to the hydraulic actuator in response to the operation of the steering unit, said directional control valve including a cylindrical casing; a control valve body slidably arranged in the casing so that a relative displacement, corresponding to the steering direction and steering angle of the front wheels, is produced between the casing and the control valve body in response to the operation of the steering unit, said control valve body having three spools arranged at intervals; hydraulic fluid filled left and right pressure control chambers defined by the casing and the control valve body so that each of the pressure control chambers changes its capacity as the control valve body undergoes relative displacement; hydraulic fluid filled left and right pressure chambers defined between adjacent spools so as to communicate with the left and right pressure control chambers, respectively; a left in-phase port formed in the casing and communicating with the left hydraulic chamber; a right in-phase port formed in the casing and communicating with the right hydraulic chamber; a left antiphase port formed in the casing and communicating with the right hydraulic chamber; a right antiphase port formed in the casing and communicating with the left hydraulic chamber, a left communication passage formed in the spool located between the left pressure control chamber and the left pressure chamber to thereby connect them; and a right communication passage formed in the spool located between the right pressure control chamber and the right pressure chamber to thereby connect them;

wherein said left in-phase port is arranged so as to connect the left pressure chamber to the left hydraulic chamber to supply the hydraulic fluid in the left pressure chamber into the left hydraulic chamber, thereby steering the rear wheels in the same direction as the front wheels, when the control valve body is moved to reduce the capacity of the left pressure control chamber; said right in-phase port is arranged so as to connect the right pressure chamber to the right hydraulic chamber to supply the hydraulic fluid in the right pressure chamber into the right hydraulic chamber, thereby steering the rear wheels in the same direction as the front wheels, when the control valve body is moved to reduce the capacity of the right pressure control chamber; said left antiphase port is arranged so as to connect the left pressure chamber to the right hydraulic chamber to supply the hydraulic fluid in the left pressure chamber to the right hydraulic chamber, thereby steering the rear wheels in the direction opposite to the steering direction of the front wheel, when the control valve body is moved to reduce the capacity of the left pressure control chamber; said right antiphase port is arranged so as to connect the right pressure chamber to the left hydraulic chamber to supply the hydraulic fluid in the right pressure chamber to the left hydraulic chamber, thereby steering the rear wheels in the direction opposite to the steering direction of the front wheels, when the control valve body is moved to reduce the capacity of the right pressure control chamber; said control valve body being formed so as to close the left and right antiphase ports and open the left and right in-phase ports until the relative displacement of the control valve body reaches a predetermined amount, and to close the in-phase ports and to open the antiphase ports when the relative displacement of the control valve body exceeds the predetermined amount.

2. The rear-wheel steering apparatus according to claim 1, wherein said directional control valve includes in-phase steering preventing means for preventing the hydraulic pressure from being supplied from the first and second in-phase ports to the hydraulic actuator; antiphase steering preventing means for preventing the hydraulic pressure from being supplied from the first and second antiphase ports to the hydraulic actuator; vehicle-speed detecting means for detecting the running speed of the vehicle; and control means for delivering control signals so that the antiphase steering preventing means is actuated when the vehicle speed, detected by the vehicle-speed detecting means, is higher than a predetermined speed, and that the in-phase steering prevention means is actuated when the detected vehicle speed is lower than the predetermined speed.

3. The rear-wheel steering apparatus according to claim 2, wherein said directional control valve further includes first and second communication ports formed in the casing and adapted to communicate the first and second pressure chambers synchronously with the first and second in-phase ports, respectively, and a communication line connecting the first and second communication ports; and said in-phase steering prevention means including a variable throttle provided in the communication line, and adapted to be opened by the control means when the detected vehicle speed is lower that the predetermined speed.

4. The rear-wheel steering apparatus according to claim 2, wherein said directional control valve further includes a first hydraulic-fluid passage connecting the first in-phase port and the first hydraulic chamber; a first branch passage diverging from the first hydraulic-fluid passage and communicating with the second antiphase port; a second hydraulic-fluid passage connecting the second in-phase port and the second hydraulic chamber; and a second branch passage diverging from the second hydraulic-fluid passage and communicating with the first antiphase port; said in-phase steering preventing means includes a first solenoid valve provided at the communication line, and formed with an open first port and a second port having a throttle, said first solenoid valve being adapted to be switched by the control means; and said antiphase steering preventing means includes a second solenoid valve provided at the first and second branch passages, and formed with an open first port and a second port having a communication passage connecting the first and second branch passages, said second solenoid valve being adapted to be operated by the control means.

5. The rear-wheel steering apparatus according to claim 1, wherein said left and right hydraulic chambers communicate with each other through a throttle.

6. A rear-wheel steering apparatus for a vehicle, which includes front wheels and rear wheels, suspended on a vehicle body and adapted to be shifted by steering means, and a steering wheel, comprising;
a steering unit for steering the front wheels in response to a rotation of the steering wheel;
a hydraulic actuator for steering the rear wheels, said actuator including left and right hydraulic chambers, and a drive member connected to the rear wheels and operating in response to a hydraulic pressure supplied to the hydraulic chambers; and
a directional control valve for supplying hydraulic pressure to the hydraulic actuator in response to the operation of the steering unit, said directional control valve including a casing; a control body arranged in the casing so that a relative displacement, corresponding to the steering direction and steering angle of the front wheels, is produced between the casing and the control valve body, in response to the operation of the steering unit; hydraulic fluid filled left and right pressure control chambers defined by the casing and the control valve body, and adapted to be alternately compressed in response to the direction of the relative displacement of the control valve body; a left in-phase port formed in the casing and communicating with the left hydraulic chamber; a right in-phase port formed in the casing and communicating with the right hydraulic chamber; a left antiphase port formed in the casing and communicating with the right hydraulic chamber; and a right antiphase port formed in the casing and communicating with the left hydraulic chamber, said left in-phase and antiphase ports adapted to be connected to the left pressure chamber; said right in-phase and antiphase ports adapted to be connected to the right pressure chamber; said control valve body being movable between an in-phase position, where the control valve body closes the left and right antiphase ports and connects the left and right in-phase ports to the left and right pressure chambers, thereby supplying hydraulic pressure to the hydraulic actuator so that the rear wheels are steered in the same direction as the front wheels, and an antiphase position, where the control valve body closes the left and right in-phase ports and connects the left and right antiphase ports to the right and left pressure chambers, thereby supplying hydraulic pressure to the hydraulic actuator so that the rear wheels are steered in the direction opposite to the steering direction of the front wheels, said control valve body being moved to the in-phase position when the steering angle of the front wheels is smaller than a predetermined angle, and being moved to the antiphase position when the steering angle of the front wheels is larger than the predetermined angle.

7. The rear-wheel steering apparatus according to claim 6, wherein said control valve body of the directional control valve is coupled mechanically to the steering unit, and adapted to shift position in response to the steering unit.

8. The rear-wheel steering apparatus according to claim 6, wherein said left and right hydraulic chambers communicate with each other through a throttle.

9. A rear-wheel steering apparatus for a vehicle, which includes front wheels and rear wheels, suspended on a vehicle body and adapted to be shifted by steering means, and a steering wheel, comprising:

a steering unit for steering the front wheels in response to the rotation of the steering wheel, the steering wheel unit being a power-steering unit, for amplifying the steering force of the steering wheel by means of hydraulic pressure;

a hydraulic actuator for steering the rear wheels, said actuator including left and right hydraulic chambers and a drive member connected to the rear wheels and operating in response to a hydraulic pressure supplied to the hydraulic chambers;

a directional control valve for supplying hydraulic pressure to the hydraulic actuator in response to the operation of the power-steering unit, said directional control valve including a cylindrical casing; a control valve body slidably arranged in the casing so that a relative displacement, corresponding to the steering direction and steering angle of the front wheels, is produced between the casing and the control valve body in response to the operation of the power-steering unit, said control valve body having three spools arranged at predetermined intervals; hydraulic fluid filled left and right pressure control chambers defined by the casing and the control valve body so that each of the pressure control chambers changes its capacity as the control valve body undergoes relative displacement; hydraulic fluid-filled left and right pressure chambers defined between adjacent spools so as to communicate with the left and right pressure control chambers, respectively; a left in-phase port formed in the casing and communicating with the left hydraulic chamber; a right in-phase port formed in the casing and communicating with the right hydraulic chamber; a left antiphase port formed in the casing and communicating with the right hydraulic chamber; a right antiphase port formed in the casing and communicating with the left hydraulic chamber; and operating means for shifting the control valve body of the directional control valve in response to the operation of the power-steering unit, by utilizing the hydraulic pressure of the power-steering unit, said operating means including a hydraulic source for supplying the directional control valve with a hydraulic pressure for shifting the control valve body, and a hydraulic selector valve arranged between the hydraulic source and the directional control valve, said hydraulic selector valve being adapted to receive the hydraulic pressure from the power-steering unit as a pilot pressure for actuation, for adjusting the hydraulic pressure supplied from the hydraulic source to the control valve body, in response to the steering direction of the front wheels, wherein said left in-phase port is arranged so as to connect the left pressure chamber to the left hydraulic chamber to supply the hydraulic fluid from the left pressure chamber into the left hydraulic chamber, thereby steering the rear wheels in the same direction as the front wheels, when the control valve body is moved to reduce the capacity of the left pressure control chamber; wherein said right in-phase port is arranged so as to connect the right pressure chamber to the right hydraulic chamber to supply the hydraulic fluid from the right pressure chamber into the right hydraulic chamber, thereby steering the rear wheels in the same direction as the front wheels, when the control valve body is moved to reduce the capacity of the right pressure control chamber; wherein said left antiphase port is arranged so as to connect the left pressure chamber to the right hydraulic chamber to supply the hydraulic fluid from the left pressure chamber to the right hydraulic chamber, thereby steering the rear wheels in the direction opposite to the steering direction of the front wheel, when the control valve body is moved to reduce the capacity of the left pressure control chamber; and wherein said right antiphase port is arranged so as to connect the right pressure chamber to the left hydraulic chamber to supply the hydraulic fluid from the right pressure chamber to the left hydraulic chamber, thereby steering the rear wheels in the direction opposite to the steering direction of the front wheels, when the control valve body is moved to reduce the capacity of the right pressure control chamber; said control valve body being formed so as to close the left and right antiphase ports and to open the left and right in-phase ports until the relative displacement of the control valve body reaches a predetermined amount, and to close the in-phase ports and to open the antiphase ports when the relative displacement of the control valve body exceeds said predetermined amount.

10. The rear-wheel steering apparatus according to claim 9, wherein said left and right hydraulic chambers communicate with each other through a throttle.

11. The rear-wheel steering apparatus according to claim 9, wherein said directional control valve includes inphase steering preventing means for preventing the hydraulic pressure from being supplied from the first and second inphase ports to the hydraulic actuator; antiphase steering preventing means for preventing the supply of hydraulic pressure from the first and second antiphase ports to the hydraulic actuator; vehicle-speed detecting means for detecting the running speed of the vehicle; and control means for delivering control signals so that the antiphase steering preventing means is actuated when the vehicle speed, detected by the vehicle-speed detecting means, is higher than a predetermined speed and so that the in-phase steering prevention means is actuated when the detected vehicle speed is lower than the predetermined speed.

12. The rear-wheel steering apparatus according to claim 11, wherein said directional control valve further includes first and second communication ports formed in the casing and adapted to communicate the first and second pressure chambers synchronously with the first and second inphase ports, respectively, and a communication line connecting the first and second communication ports; and said in-phase steering prevention means including a variable throttle provided in the communication line, said in-phase steering prevention means being adapted to be opened by the control means when the detected vehicle speed is lower than the predetermined speed.

13. The rear-wheel steering apparatus according to claim 11, wherein said directional control valve further includes a first hydraulic-fluid passage connecting the first in-phase port and the first hydraulic chamber; a first branch passage diverging from the first hydraulic-fluid passage and communicating with the second antiphase port; a second hydraulic-fluid passage connecting the second in-phase port and the second hydraulic chamber; and a second branch passage diverging from the second hydraulic-fluid passage and communicating with the first antiphase port; said in-phase steering preventing means includes a first solenoid valve provided in the communication line and having an open first port and a second port with a throttle, said first solenoid valve being adapted to be switched by the control means; and said antiphase steering preventing means includes a second solenoid valve provided in the first and second branch passage and having an open first port and a second port with a communication passage connecting the first and second branch passages, said second solenoid valve being adapted to be operated by the control means.

* * * * *